United States Patent
Kim et al.

(10) Patent No.: US 9,538,071 B2
(45) Date of Patent: Jan. 3, 2017

(54) ELECTRONIC APPARATUS HAVING A PHOTOGRAPHING FUNCTION AND METHOD OF CONTROLLING THE SAME

(71) Applicant: SAMSUNG ELECTRONICS CO., LTD., Suwon-si, Gyeonggi-do (KR)

(72) Inventors: Su-kyung Kim, Seoul (KR); Jin-pyo Gwak, Seoul (KR); Hyun-ock Yim, Seoul (KR); Won-hyung Cho, Seongnam-si (KR); Dae-hong Ki, Suwon-si (KR); Sung-ho Kim, Seoul (KR); Jin-ha Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/559,193

(22) Filed: Dec. 3, 2014

(65) Prior Publication Data

US 2015/0189164 A1 Jul. 2, 2015

(30) Foreign Application Priority Data

Dec. 27, 2013 (KR) .......................... 10-2013-0165960

(51) Int. Cl.
*H04N 5/222* (2006.01)
*H04N 5/232* (2006.01)
(Continued)

(52) U.S. Cl.
CPC ...... *H04N 5/23216* (2013.01); *H04N 5/23293* (2013.01); *H04N 5/772* (2013.01); *H04N 5/907* (2013.01); *H04N 9/8042* (2013.01)

(58) Field of Classification Search
CPC ........................ H04N 5/23216; H04N 5/23219; H04N 5/23293;H04N 5/772; H04N 5/907; H04N 9/8042
See application file for complete search history.

(56) References Cited

U.S. PATENT DOCUMENTS

| | | | |
|---|---|---|---|
| 8,659,667 B2 * | 2/2014 | Syed | H04N 1/00137 348/207.1 |
| 2004/0252217 A1 * | 12/2004 | Battles | H04N 5/232 348/333.01 |

(Continued)

FOREIGN PATENT DOCUMENTS

| | | |
|---|---|---|
| JP | 4764959 B1 | 9/2011 |
| JP | 2012-108097 A | 6/2012 |

(Continued)

OTHER PUBLICATIONS

Imaging-resource.com, "Sony NEX-5N Review," downloaded from website: http://www.imaging-resource.com/PRODS/NEX5N/NEX5NA3.HTM, pp. 1-22 (downloaded Aug. 18, 2014).

(Continued)

*Primary Examiner* — Aung S Moe
*Assistant Examiner* — John H Morehead, III
(74) *Attorney, Agent, or Firm* — Drinker Biddle & Reath LLP

(57) ABSTRACT

In an electronic apparatus having a photographing function and a method of controlling the same, a qualitative description and a quantitative setting link with each other flexibly so as to provide a mixed linkage guide so that the qualitative description and the quantitative setting may be reused, and a qualitative description and a quantitative setting which will be added later may link with each other freely.

17 Claims, 13 Drawing Sheets

(51) Int. Cl.
*H04N 5/77* (2006.01)
*H04N 5/907* (2006.01)
*H04N 9/804* (2006.01)

(56) References Cited

U.S. PATENT DOCUMENTS

| | | | | |
|---|---|---|---|---|
| 2009/0083667 A1* | 3/2009 | Uchida | ............. | G06F 3/0482 715/835 |
| 2011/0007177 A1* | 1/2011 | Kang | ............. | H04N 5/232 348/222.1 |
| 2011/0019009 A1* | 1/2011 | Moriyama | ............. | H04N 5/232 348/207.1 |
| 2011/0292248 A1* | 12/2011 | de Leon | ............. | H04N 1/00307 348/231.99 |
| 2011/0298899 A1 | 12/2011 | Masuda | | |
| 2013/0050507 A1* | 2/2013 | Syed | ............. | H04N 1/00137 348/207.1 |
| 2013/0188061 A1* | 7/2013 | Ellenby | ............. | G03B 17/24 348/207.1 |
| 2013/0231861 A1 | 9/2013 | Yokoyama et al. | | |

FOREIGN PATENT DOCUMENTS

| | | |
|---|---|---|
| JP | 5174942 B2 | 4/2013 |
| JP | 2013-110713 A | 6/2013 |
| JP | 2013-114457 A | 6/2013 |
| JP | 2013-210641 A | 10/2013 |

OTHER PUBLICATIONS

Panasonic Corp., "Panasonic Operating Instructions Digital Camera Model No. DMC-FX07 DMC-FX3," downloaded from website: http://data.manualslib.com/pdf/12/1181/118086-panasonic/lumix_dmcfx07k.pdf?7db054448b338c0cb459cafb28206e83&take=binary, pp. 1-128 (Dec. 12, 2006).

* cited by examiner

ELECTRONIC APPARATUS HAVING A PHOTOGRAPHING FUNCTION AND METHOD OF CONTROLLING THE SAME

RELATED APPLICATION

This application claims the priority benefit of Korean Patent Application No. 10-2013-0165960, filed on Dec. 27, 2013, in the Korean Intellectual Property Office, the disclosure of which is incorporated herein in its entirety by reference.

BACKGROUND

1. Field

One or more embodiments relate to an electronic apparatus having a photographing function and a method of controlling the same.

2. Description of the Related Art

Electronic apparatuses having a photographing function or digital photographing apparatuses, for example, digital cameras or cameras built in smartphones, each have a photographing guide function recently. There are two methods of the photographing guide function of a digital camera, i.e., a qualitative photographing guide method and a quantitative photographing guide method. An example of the qualitative photographing guide method includes a manual that describes a photographing method using the digital camera, and an example of the quantitative photographing guide method is called a mode and includes a method of setting an expert's preset setting value in a situation.

SUMMARY

One or more embodiments include an electronic apparatus having a photographing function in which a flexibly-linkage mixed guide is provided, a qualitative description and a quantitative setting may be reused and a qualitative description and a quantitative setting which will be added later may link with each other freely, and a method of controlling the electronic apparatus.

Additional aspects will be set forth in part in the description which follows and, in part, will be apparent from the description, or may be learned by practice of the presented embodiments.

According to one or more embodiments, a method of controlling an electronic apparatus having a photographing function includes: providing a plurality of qualitative description menus for describing a photographing guide function and a plurality of quantitative setting menus each including a photographing setting value; creating a linkage photographing guide menu by combining a selected qualitative description menu selected from among the plurality of qualitative description menus with a selected quantitative setting menu selected from among the plurality of quantitative setting menus; displaying the linkage photographing guide menu; and when a photographing signal for capturing an image of a subject is received, controlling a photographing operation based on the photographing setting value included in the selected quantitative setting menu.

The method may further include downloading at least one of the plurality of qualitative description menus and the plurality of quantitative setting menus from an external device connected to a network.

The method may further include storing at least one of the plurality of qualitative description menus and the plurality of quantitative setting menus in an internal memory of the electronic apparatus.

The method may further include storing at least one of the plurality of qualitative description menus and the plurality of quantitative setting menus in an external memory that is attached to or detached from the electronic apparatus.

The selected quantitative setting menu may be selected from among the plurality of quantitative setting menus so as to match the selected qualitative description menu.

The selected qualitative description menu may be selected from among the plurality of qualitative description menus so as to match the selected quantitative setting menu.

The method may further include displaying at least two quantitative setting menus that match the one selected qualitative description menu from among the plurality of quantitative setting menus.

The method may further include displaying at least two qualitative description menus that match the selected quantitative setting menu from among the plurality of qualitative description menus.

The method may further include creating the plurality of qualitative description menus and the plurality of quantitative setting menus by a manufacturer of the electronic apparatus, an expert, or a user.

The method may further include creating at least one quantitative setting menu from among the plurality of quantitative setting menus based on the photographing setting value included in additional information of an image file.

The method may further include: receiving a selection signal of a photographing mode disposed on a display screen on which the linkage photographing guide menu is displayed; converting a current mode of the electronic apparatus into a photographing mode for capturing an image of the subject according to the received selection signal; and displaying a live view image including the subject.

According to one or more embodiments, an electronic apparatus having a photographing function includes: a qualitative description guide unit that provides a plurality of qualitative description menus for describing a photographing guide function; a quantitative setting unit that provides a plurality of quantitative setting menus each including a photographing setting value; a mixed linkage unit that creates a linkage photographing guide menu by combining a selected qualitative description menu selected from among the plurality of qualitative description menus with a selected quantitative setting menu selected from among the plurality of quantitative setting menus; and a controller that displays the linkage photographing guide menu and when a photographing signal for capturing an image of a subject is received, controls a photographing operation based on the photographing setting value included in the one selected quantitative setting menu.

At least one of the plurality of qualitative description menus and the plurality of quantitative setting menus may be downloaded from an external device connected to a network.

The electronic apparatus may further include a storage unit that stores at least one of the plurality of qualitative description menus and the plurality of quantitative setting menus.

The electronic apparatus may further include an external memory that stores at least one of the plurality of qualitative description menus and the plurality of quantitative setting menus.

The mixed linkage unit may select the selected quantitative setting menu from among the plurality of quantitative setting menus so as to match the selected qualitative description menu or selects the selected qualitative description menu from among the plurality of qualitative description menus so as to match the selected quantitative setting menu.

The controller may display at least two quantitative setting menus that match the selected qualitative description menu from among the plurality of quantitative setting menus or may display at least two qualitative description menus that match the selected quantitative setting menu from among the plurality of qualitative description menus.

The plurality of qualitative description menus and the plurality of quantitative setting menus may be created by a manufacturer of the electronic apparatus, an expert, or a user.

At least one quantitative setting menu from among the plurality of quantitative setting menus may be created based on the photographing setting value included in additional information of an image file.

According to one or more embodiments, there is provided a recording medium having a program for executing the method in a computer recorded thereon.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
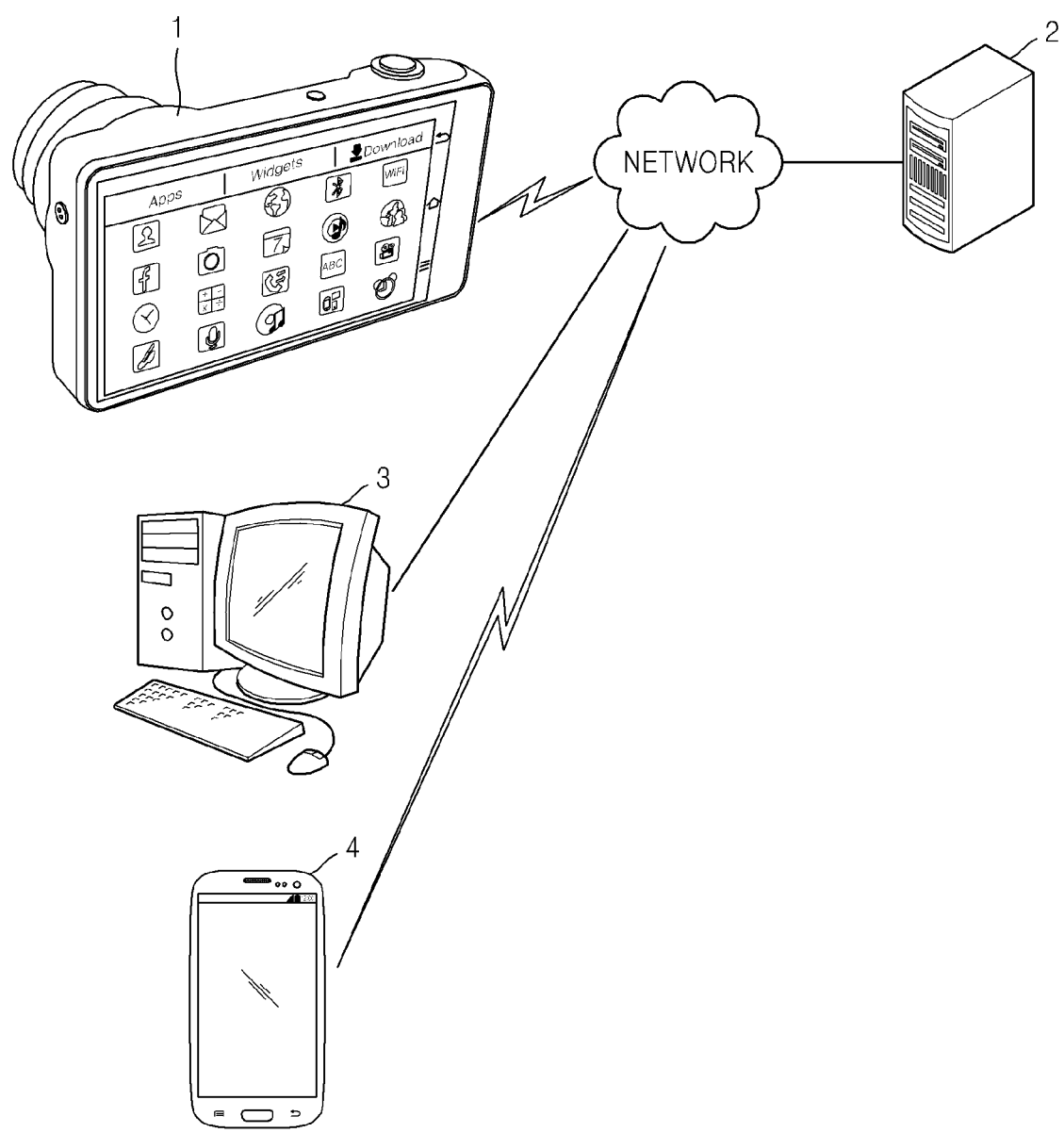
FIG. 1 is a schematic view of a system including an electronic apparatus having a photographing function that provides a mixed photographing guide menu obtained by combining a qualitative description menu and a quantitative setting menu, according to an embodiment.

An electronic apparatus having a photographing function and a method of controlling the same according to certain embodiments will be described below in more detail with reference to the accompanying drawings. Those components that are the same or are in correspondence are rendered the same reference numeral regardless of the figure number, and redundant explanations are omitted.

Although the following embodiments illustrate a digital camera that is an electronic apparatus, this is not limited to the present embodiments and may be applied to various digital apparatuses, such as digital camcorders, personal digital assistants (PDAs), or smartphones.

FIG. 1 is a schematic view of a system including an electronic apparatus 1 having a photographing function that provides a mixed photographing guide menu obtained by combining a qualitative description menu and a quantitative setting menu. Here, the qualitative description menu or the quantitative setting menu may be provided from a server 2 or may be manually generated by a user of the electronic apparatus 1. Also, the qualitative description menu or the quantitative setting menu may be transmitted directly from a personal computer (PC) 3 or a mobile device 4, or the qualitative description menu or the quantitative setting menu stored in the server 2 may also be transmitted.

Figure 4A:
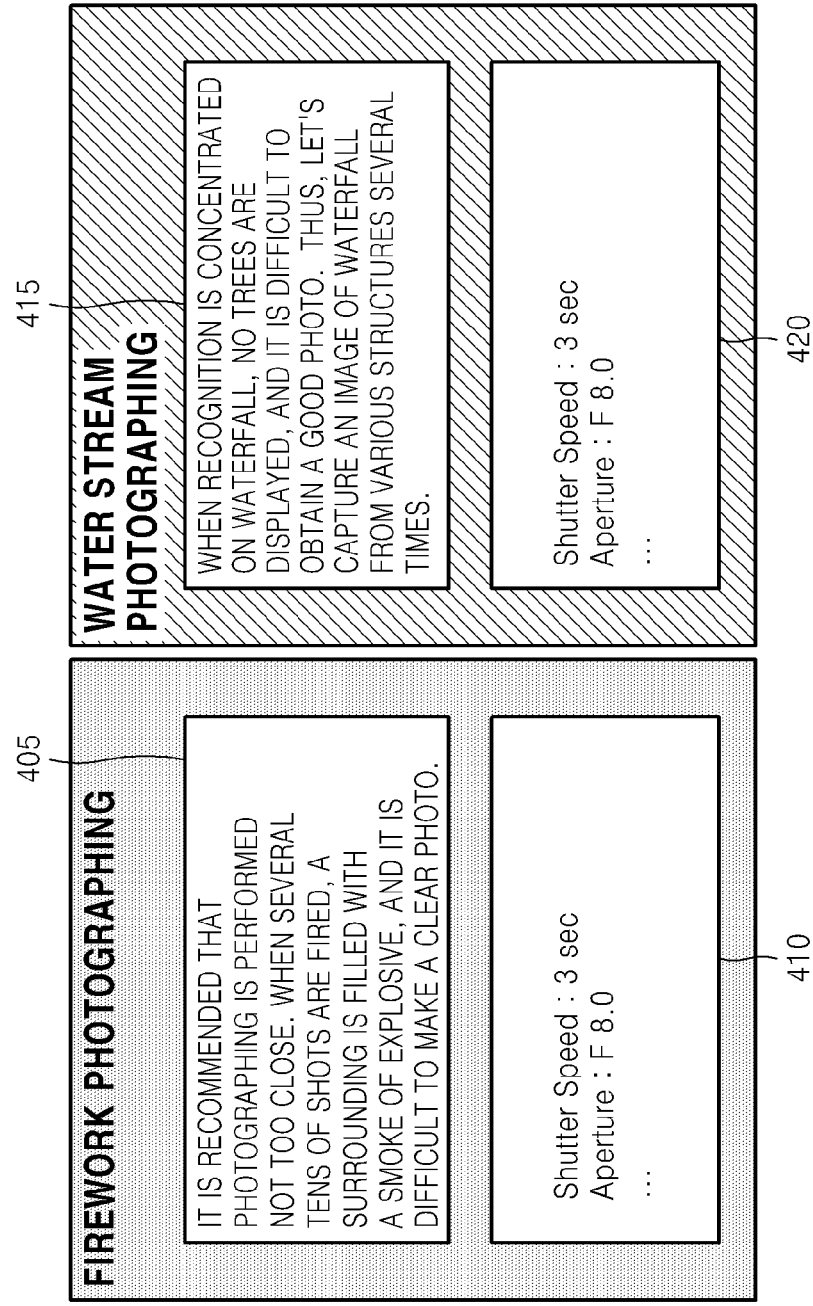
FIGS. 4A, 4B, 5A, and 5B illustrate a qualitative description menu and a quantitative setting menu, according to various embodiments.

FIGS. 4A, 4B, 5A, and 5B illustrate a qualitative description menu and a quantitative setting menu, according to various embodiments. A photographing guide menu entitled 'firework photographing' is illustrated in FIG. 4A. Here, when the electronic apparatus 1 photographs fireworks, a qualitative description menu 405 includes precautions, description, and the like. A quantitative setting menu 410 includes a photographing setting value, and when the electronic apparatus 1 photographs fireworks, as illustrated in FIG. 4A, it is guided that a shutter speed is set to 3 seconds and an aperture value is set to F8.0. Similarly, a photographing guide menu entitled 'water stream photographing' includes a qualitative description menu 415 and a quantitative setting menu 420. Thus, as illustrated in FIG. 4A, a user may overcome a limitation in each of the qualitative description menu 405 and the quantitative setting menu 410 through the photographing guide menu entitled 'firework photographing'. For example, a problem that the user does not know how to set a photographing setting value only through the qualitative description menu 405, and a problem that the user who has received only the quantitative setting menu 410 does not exactly know how to photograph and where to perform photographing when the electronic apparatus 1 photographs fireworks may be solved.

Figure 4B:
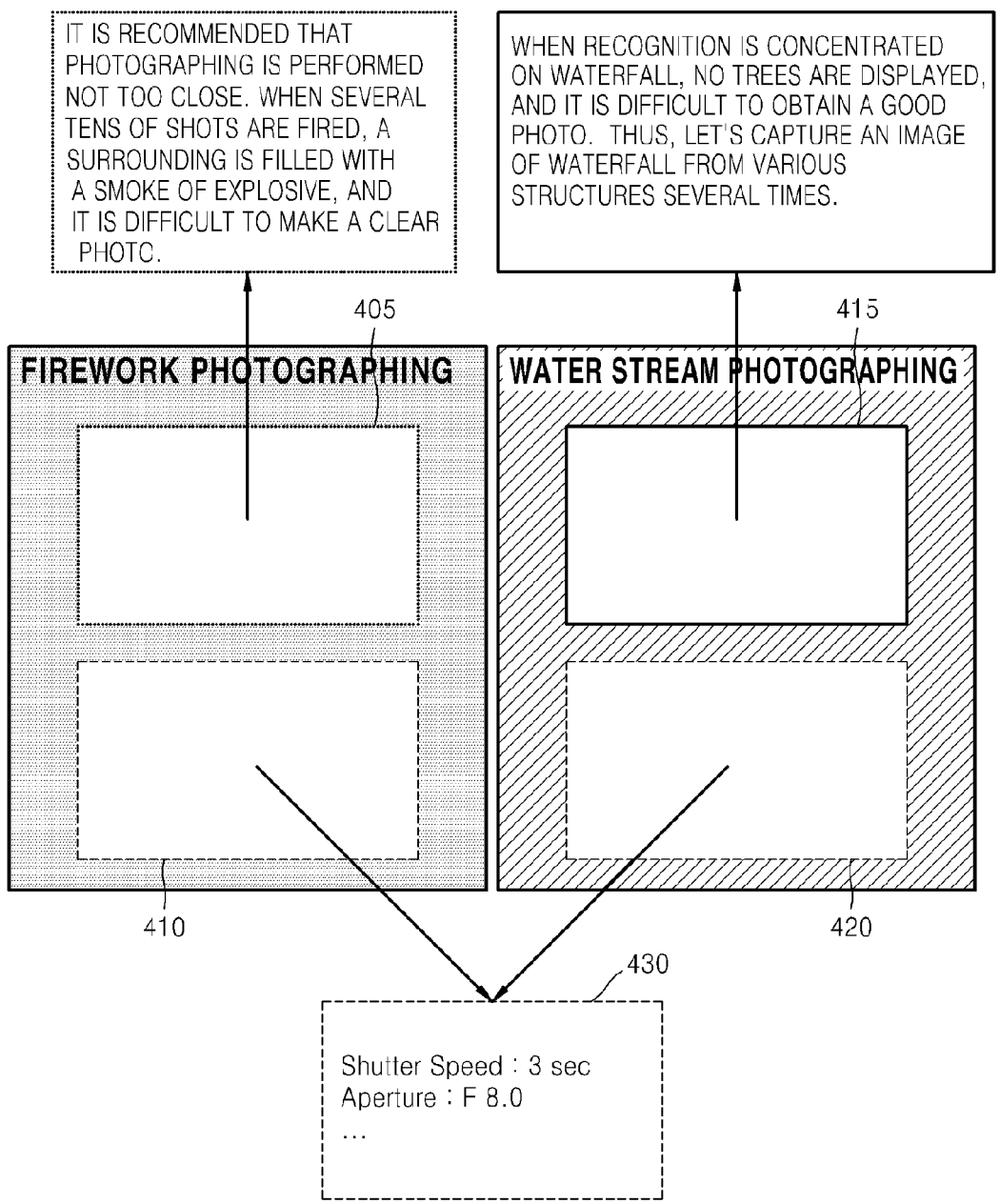

Referring to FIGS. 4B and 4A, qualitative description menus 405 and 415 for firework photographing and water stream photographing, respectively, are different from each other, but quantitative setting menus 410 and 420 are the same. In this case, comparing FIG. 4A with FIG. 4B, methods of processing the same quantitative setting menus 410 and 420 are different. In FIG. 4B, since a flexible connection method is used, when the same quantitative setting menus are present, the same storage space may be used. However, in FIG. 4A, since a static connection method is used, the same quantitative setting menus have to be individually stored. Thus, when a qualitative description menu and a quantitative setting menu are provided to a photographing guide menu entitled 'firework photographing' without a linkage system, the qualitative description menu and the quantitative setting menu are not separated from each other and may take an unnecessary memory space. Also, the qualitative description menu to be added to or updated in firework photographing, or the quantitative setting menu may not be included in the photographing guide menu entitled 'firework photographing', and the user may not select, combine and reuse the qualitative description menu and the quantitative setting menu dynamically. The above-mentioned problems may be solved using the linkage system.

In a linkage photographing guide menu obtained by combining a qualitative description menu and a quantitative setting menu according to an embodiment, as illustrated in FIG. 4B, qualitative description menus are different from each other, and when quantitative setting menus are the same, the quantitative setting menus are shared. Here, although the quantitative setting menus are shared, the qualitative description menus may also be shared. Also, since the quantitative setting menus link with each other flexibly, the quantitative setting menus may link with a quantitative setting menu that is not in firmware of the electronic apparatus 1 and that is created by the user or a quantitative setting menu received from a server (e.g., the server 2 illustrated in FIG. 1). The linkage photographing guide menu obtained by the qualitative description menu and the quantitative setting menu according to an embodiment will be described below.

The electronic apparatus 1 may capture an image, may generate an image file, and may transmit the generated image file directly or indirectly to the server 2, the PC 3, or the mobile device 4 using a wired or wireless communication network. The electronic apparatus 1 may include a digital single lens reflex (DSLR) camera, a mirrorless camera, or a smartphone. However, embodiments are not limited thereto, and the electronic apparatus 1 may also be applied to any type of apparatus having a camera module for capturing an image of a subject and generating an image, as well as a lens and an imaging device.

The server 2 may provide a cloud service or a social network service. The server 2 stores the qualitative guide menu or quantitative setting menu transmitted from the electronic apparatus 1, the PC 2, or the mobile device 4.

The mobile device 4 may include a laptop computer, a mobile phone, a tablet PC, or a smartphone. This is not limited to the present embodiments, and the mobile device 4 may include a communication module, such as a code division multiple access (CDMA) module, a Bluetooth module, an infrared communication module, or a wired or wireless LAN card, and may be interpreted as including a mobile communication terminal having a microprocessor for performing a multimedia playing function or for performing an arithmetic operation.

Figure 2:
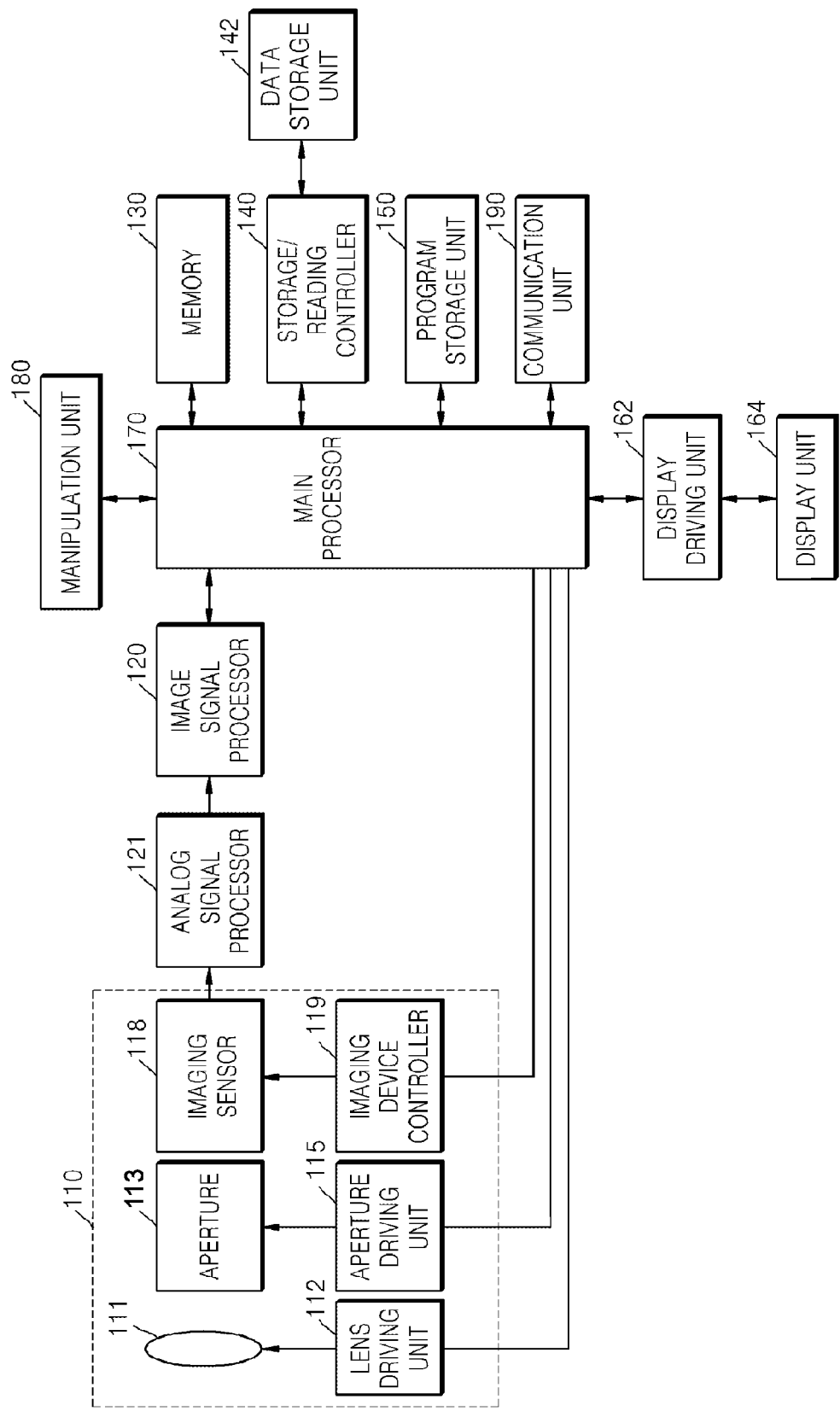
FIG. 2 is a schematic view of the electronic apparatus illustrated in FIG. 1, according to an embodiment.

FIG. 2 is a schematic view of the electronic apparatus 1 illustrated in FIG. 1, according to an embodiment. Referring to FIG. 2, the electronic apparatus 1 of FIG. 1 may include a photographing unit 110, an image signal processor 120, an analog signal processor 121, a memory 130, a storage/reading controller 140, a data storage unit 142, a program storage unit 150, a display driving unit 162, a display unit 164, a main processor 170, and a manipulation unit 180.

The whole operation of the electronic apparatus 1 is controlled by the main processor 170. The main processor 170 provides control signals for operations of elements, such as a lens driving unit 112, an aperture driving unit 115, and an imaging device controller 119.

The photographing unit 110 includes a lens 111, the lens driving unit 112, an aperture 113, the aperture driving unit 115, an imaging sensor 118, and the imaging device controller 119, which are elements for generating an image from an electrical signal from incident light. The lens 111 may include a plurality of lens groups and a plurality of lenses. A position of the lens 111 is adjusted by the lens driving unit 112. The lens driving unit 112 adjusts the position of the lens 111 in response to a control signal provided by the main processor 170. A degree of opening/closing the aperture 113 is adjusted by the aperture driving unit 115, and the aperture 113 adjusts the amount of light incident on the imaging sensor 118. An optical signal transmitted through the lens 111 and the aperture 113 reaches a light-receiving surface of the imaging sensor 118 and forms an image of the subject. The imaging sensor 118 may be a charge coupled device (CCD) image sensor or a complementary metal oxide semiconductor image sensor (CIS) that converts the optical signal into an electrical signal. Sensitivity of the imaging sensor 118 may be adjusted by the imaging device controller 119. The imaging device controller 119 may control the imaging sensor 118 in response to a control signal that is automatically generated by the image signal that is input in real-time or a control signal that is manually input by user's manipulation. The analog signal processor 121 may perform processing, such as noise reduction, gain control, waveform shaping, and analog-digital conversion, on an analog signal supplied from the imaging sensor 118.

The image signal processor 120 is a signal processor that processes a specific function on an image data signal processed by the analog signal processor 121. For example, the image signal processor 120 may reduce noise from input image data and may perform image signal processing for improvements in image quality and for providing specific effects, such as gamma correction, color filter array interpolation, color matrix, color correction, color enhancement white balance control, brightness smoothing, and color shading. The image signal processor 120 may generate an image file by compressing the input image data or may restore the image data from the image file. A format of compression of the image may be a reversible or irreversible format. As an example of an appropriate format, a still image may be transformed in a joint photographic experts group (JPEG) format or a JPEG 2000 format. Also, when a moving picture is recorded, a moving picture file may be generated by compressing a plurality of frames according to a moving picture experts group (MPEG) standard. The image file may be generated according to an exchangeable image file format (Exif) standard, for example.

The image signal processor 120 may generate a moving picture file from an imaging signal generated by the imaging sensor 118. The imaging signal may be a signal generated by the imaging sensor 118 and then processed by the analog signal processor 121. The image signal processor 120 may generate frames to be included in the moving picture file from the imaging signal, may encode the frames according to standards, such as MPEG 4, H.264/AVC, and windows media video (WMV), may compress the moving picture and then may generate a moving picture file using the compressed moving picture. The moving picture file may be generated in various formats, such as mpg, mp4, 3gpp, avi, asf, and mov.

The image data output from the image signal processor 120 is input to the storage/reading controller 140 via the memory 130 or directly. The storage/reading controller 140 stores the image data in the data storage unit 142 according to a signal from the user or automatically. Also, the storage/reading controller 140 may read data regarding an image from the image file stored in the data storage unit 142, may input the data to the display driving unit 162 via the memory 130 or via another path, and may cause the image to be displayed on the display unit 164. The data storage unit 142 may be detachable or may be permanently mounted on the digital electronic apparatus 1.

Also, the image signal processor 120 may perform unsharpness processing, color processing, blur processing, edge emphasis processing, image interpretation processing, image recognition processing, and image effect processing on the input image data. Face recognition or scene recognition processing may be performed as image recognition processing. Furthermore, the image signal processor 120 may perform display image signal processing so that the image may be displayed on the display unit 164. For example, the image signal processor 120 may perform generation and image synthesis processing, such as brightness level control, color correction, contrast control, contour emphasis control, screen division processing, and character image.

The signal processed by the image signal processor 120 may be input to the main processor 170 via the memory 130 or directly. Here, the memory 130 operates as a main memory of the electronic apparatus 1 and stores information for an operation of the image signal processor 120 or the main processor 170 temporarily. The program storage unit 150 may store a program of an operating system for operating the electronic apparatus 1 or an application system.

Furthermore, the electronic apparatus 1 includes the display unit 164 so as to display an operating state of the electronic apparatus 1 or information regarding the image captured by the electronic apparatus 1. The display unit 164 may provide visual information and/or auditory information to the user. In order to provide the visual information, the display unit 164 may be configured of a liquid crystal display (LCD) panel or an organic light emitting display panel, for example. Also, the display unit 164 may be a touch screen that may recognize input by touch.

The display driving unit 162 provides a driving signal to the display unit 164.

The main processor 170 may process the input image signal and may control elements according to the input image signal or an externally-input signal. The main processor 170 may be one or a plurality of microprocessors. One or a plurality of microprocessors may be implemented as an array of a plurality of logic gates or a combination of a memory in which a program that may be executed in a general-purpose microprocessor and a program that may be executed in the microprocessor 170 are stored. Also, it will be understood by one of ordinary skill in the art that one or a plurality of microprocessors may be implemented as hardware having another shape.

The main processor 170 may execute a program stored in the program storage unit 150 or may include an additional module so as to generate control signals for controlling autofocusing, zooming changing, focus changing, and automatic exposure correction, to provide the control signals to the aperture driving unit 115, the lens driving unit 112, and the imaging device controller 119 and to control the whole operation of elements of the electronic apparatus 1, such as a shutter, a strobo, and the like.

Also, the main processor 170 may be connected to an external monitor, may perform image signal processing on the image signal input from the image signal processor 120 so that the image signal may be displayed on the external monitor, and may transmit image data obtained by this processing so that a corresponding image may be displayed on the external monitor.

The manipulation unit 180 is a unit via which the user may input a control signal. The manipulation unit 180 may include various functional buttons, such as a shutter-release button for inputting a shutter-release signal that allows the imaging sensor 118 to be exposed to light for an amount of time and to perform a photographing operation, a power button for inputting a control signal for controlling turn on/off of power, a zooming button that allows a viewing angle to be increased or decreased according to input, a mode selection button, and other photographing setting value adjustment buttons.

The manipulation unit 180 may be implemented as any type of manipulation unit via which the user may input a control signal, such as a button, a keyboard, a touch pad, a touch screen, or a remote controller.

A communication unit 190 may include a network interface card (NIC) or modem. The communication unit 190 may allow the electronic apparatus 1 to communicate with an external device (the server 2, the PC 3, or the mobile device 4 illustrated in FIG. 1) via a network in a wired or wireless manner.

Figure 3:
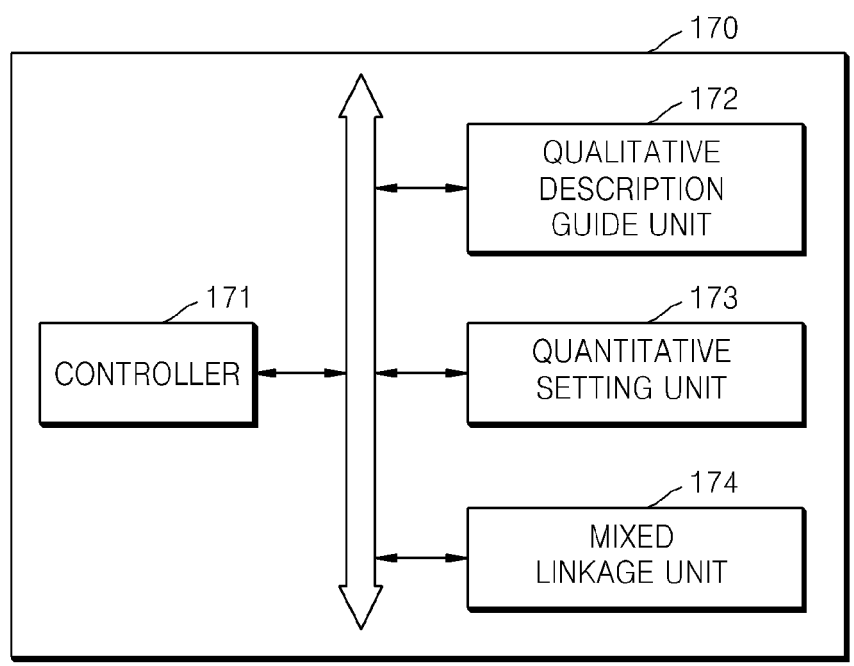
FIG. 3 is a schematic block diagram of a main processor illustrated in FIG. 2, according to an embodiment.

FIG. 3 is a schematic block diagram of the main processor 170 illustrated in FIG. 2, according to an embodiment. Referring to FIG. 3, the main processor 170 provides a plurality of qualitative description menus for describing a photographing guide function and provides a plurality of quantitative setting menus each including a photographing setting value. The main processor 170 selects one from among the plurality of qualitative description menus according to the user's selection using the manipulation unit 180 and receives one selected from among the plurality of quantitative setting menus. Also, the main processor 170 may receive one selected from among the plurality of qualitative description menus or may recommend a quantitative setting menu that corresponds to the selected qualitative description menu. The main processor 170 generates a linkage photographing guide menu obtained by combining the selected qualitative description menu and the quantitative setting menu and displays the generated linkage photographing guide menu on the display unit 164.

When the main processor 170 receives a photographing signal for capturing an image of a subject (i.e., a shutter-release signal), the main processor 170 performs a photographing operation based on a photographing setting value included in the quantitative setting menu of the displayed linkage photographing guide menu. For example, when the photographing setting value, for example, a shutter speed is 10 seconds, an aperture value is F 2.0 and sensitivity is ISO 10, the main processor 170 outputs photographing control signals to a shutter driving unit (not shown), the aperture driving unit 115, and a sensitivity adjustment unit (not shown) so as to capture the image of the subject. Here, when the linkage photographing guide menu is generated, if the photographing setting value included in the quantitative setting menu is set in the electronic apparatus 1 and the photographing signal is received, photographing may be immediately performed.

Referring back to FIG. 3, the main processor 170 includes a controller 171, a qualitative description guide unit 172, a quantitative setting unit 173, and a mixed linkage unit 174. The main processor 170 will be understood as an embodiment of an electronic apparatus used in the claims.

Figure 5A:
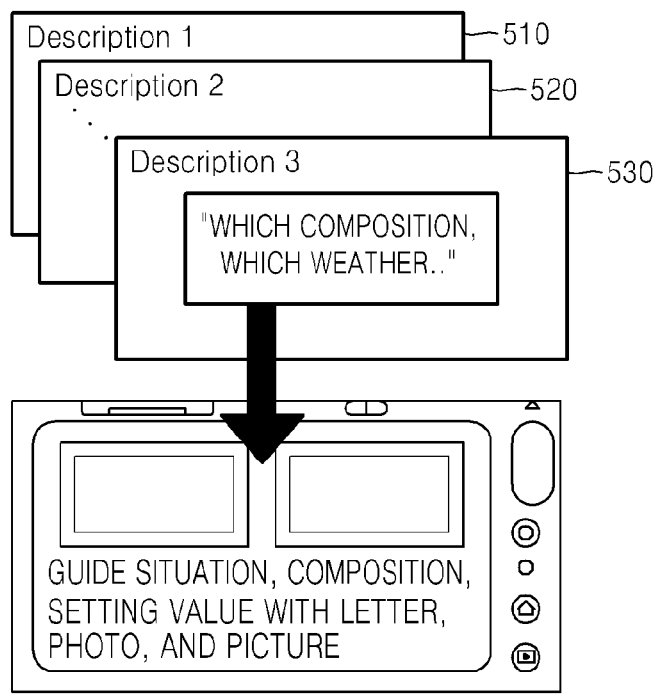
Figure 5B:
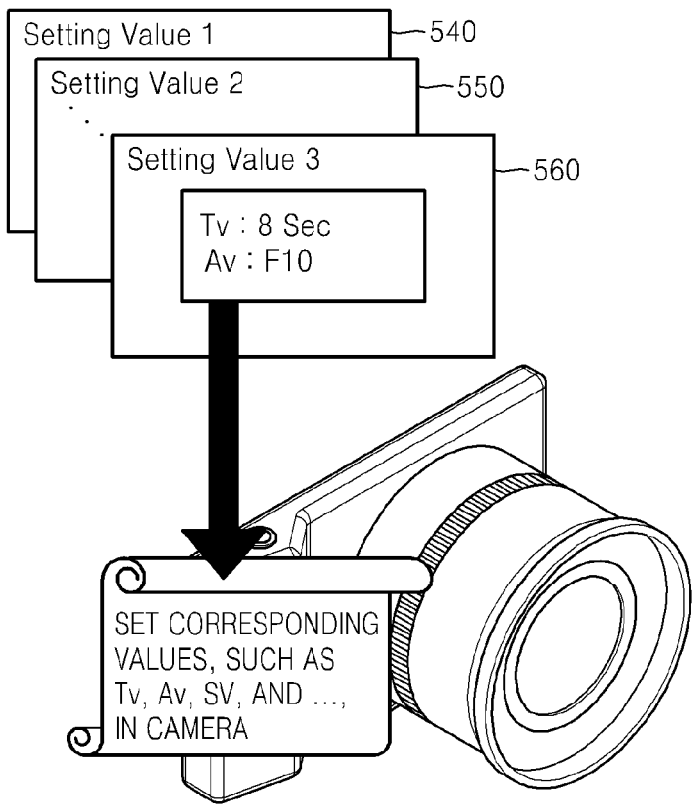

The qualitative description guide unit 172 provides a plurality of qualitative description menus for describing the photographing guide function. The qualitative description guide unit 172 provides a plurality of qualitative description menus 510, 520, and 530, as illustrated in FIG. 5A. For example, the qualitative description menu 530 guides a photographing description to the user via writing, a picture, or a photo. The quantitative setting unit 173 provides a plurality of quantitative setting menus each including a photographing setting value. The quantitative setting unit 173 provides a plurality of quantitative setting menus 540, 550, and 560, as illustrated in FIG. 5B. For example, the quantitative setting unit 173 guides a photographing description to each photographing setting value, i.e., a shutter speed of 8 seconds and an aperture value of F10 in a numerical manner. Here, the plurality of qualitative description menus provided by the qualitative description guide unit 172 and the plurality of quantitative setting menus provided by the quantitative setting unit 173 may be stored in the memory 130 of the electronic apparatus 1 or may be stored in an external memory that is attached to or detached from the electronic apparatus 1, for example, a memory card, or the server 2 illustrated in FIG. 1. The qualitative description guide unit 172 and the quantitative setting unit 173 may provide menus by extracting the menus stored in the memory 130 or by downloading the menus from the server 2.

Also, these menus may be manufactured by the user, a manufacturer, or an expert.

Figure 6:
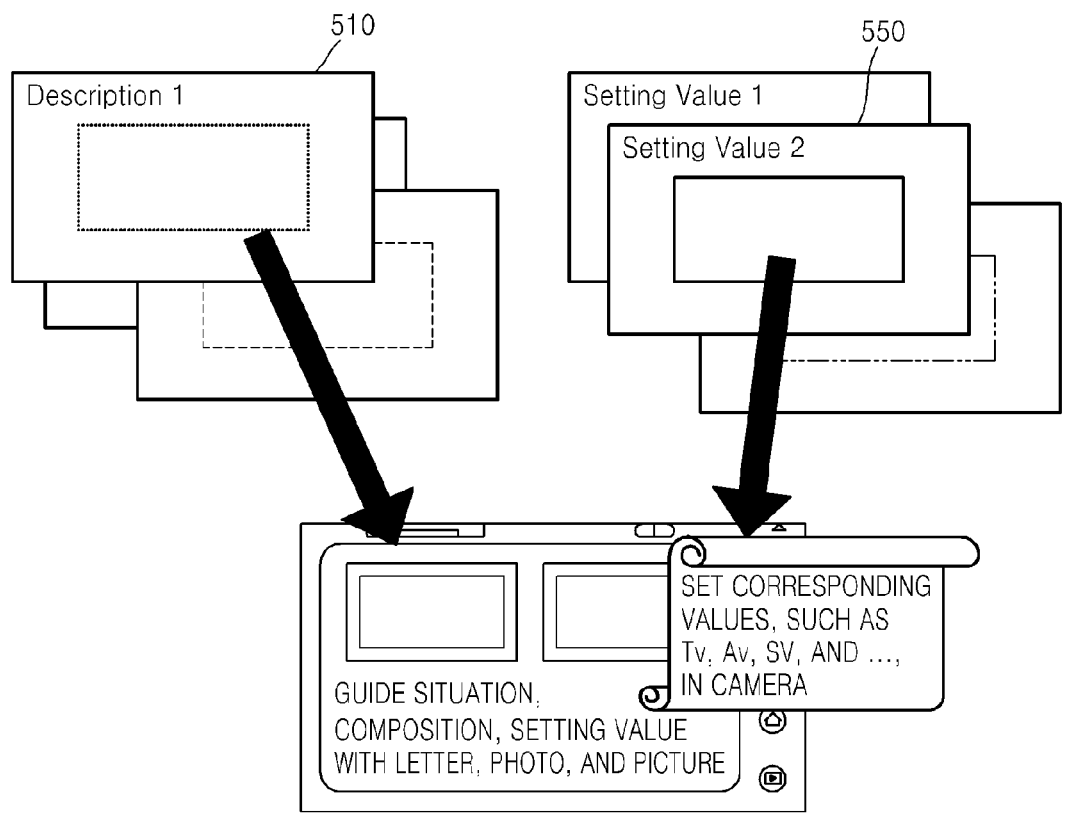
FIG. 6 illustrates a photographing guide menu obtained by combining a qualitative description menu and a quantitative setting menu with each other, according to an embodiment.

FIG. 6 illustrates a photographing guide menu obtained by combining a qualitative description menu 510 and a quantitative setting menu 550 with each other, according to an embodiment. The mixed linkage unit 174 generates a linkage photographing guide menu obtained by combining one selected from among the plurality of qualitative description menus with one selected from the plurality of quantitative setting menus. As illustrated in FIG. 6, the mixed linkage unit 174 combines the first qualitative description menu 510 selected from among the plurality of qualitative description menus with the second quantitative setting menu 550 selected from among the plurality of quantitative setting menus. The mixed linkage unit 174 may display the combined linkage photographing guide menu, i.e., the qualitative description menu, on the display 164 and may set a photographing setting value in the controller 171 or the main processor 170. The mixed linkage unit 174 may cause the qualitative description menu and the quantitative setting menu to be simultaneously executed, or may display the qualitative description menu and may set a photographing setting value included in the quantitative setting menu.

The controller 171 performs a photographing operation based on the photographing setting value included in one selected quantitative setting menu when the main processor 170 displays the linkage photographing guide menu generated by the mixed linkage unit 174 and receives the photographing signal for capturing the image of the subject.

Figure 7:
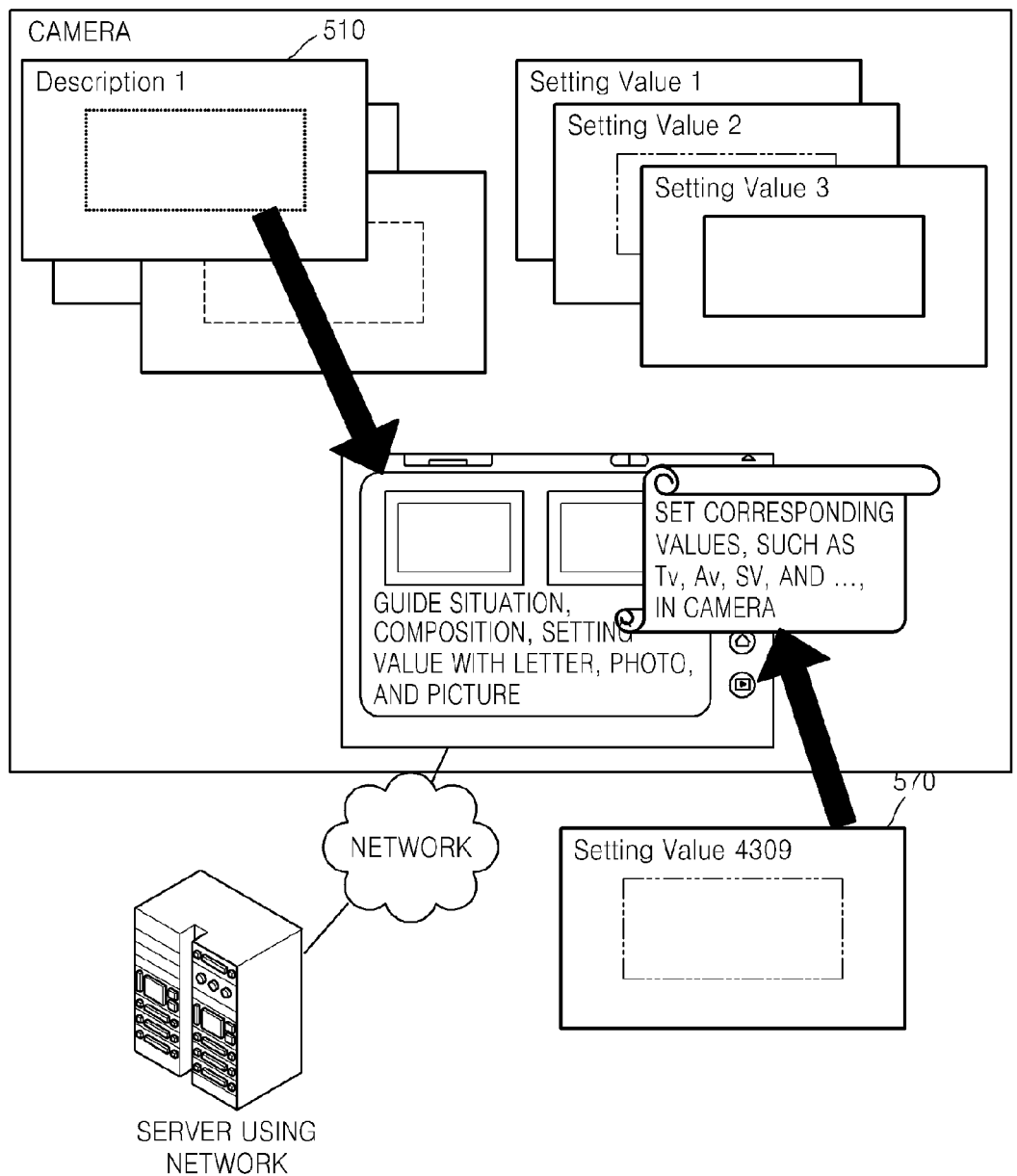
FIG. 7 illustrates a linkage photographing guide menu obtained by combining a qualitative description menu and a quantitative setting menu with each other, according to another embodiment.

FIG. 7 illustrates a linkage photographing guide menu obtained by combining a qualitative description menu and a quantitative setting menu with each other, according to another embodiment. Referring to FIG. 7, in another embodiment, a case that the qualitative description menu is stored in the memory 130 of the electronic apparatus 1 and no user's desired quantitative setting menu is present in the electronic apparatus 1, will now be described.

When the user selects the first qualitative description menu 510 from among the plurality of qualitative description menus provided by the electronic apparatus 1 and no desired quantitative setting menu is present in the electronic apparatus 1, a quantitative setting menu 570 may be downloaded from an external device, for example, a server connected to a network, and a linkage photographing guide menu obtained by combining the first qualitative description menu 510 and the downloaded quantitative setting menu 570 may be presented. For example, when the user likes a qualitative manual regarding night photographing but wants to change a shutter speed of 5 seconds that is a quantitative setting that links with the qualitative manual, the qualitative manual may link with a photographing setting value 'flash on' that is outside the electronic apparatus 1. Thus, since a qualitative description and a quantitative setting are set as one bunch and the bunch is stored in a camera according to the related art, the quantitative setting included in the bunch cannot link with a qualitative description to be added later via the server. However, according to the current embodiment, the user may interlock the qualitative description and the quantitative setting freely according to a desired method or combination.

Figure 8:
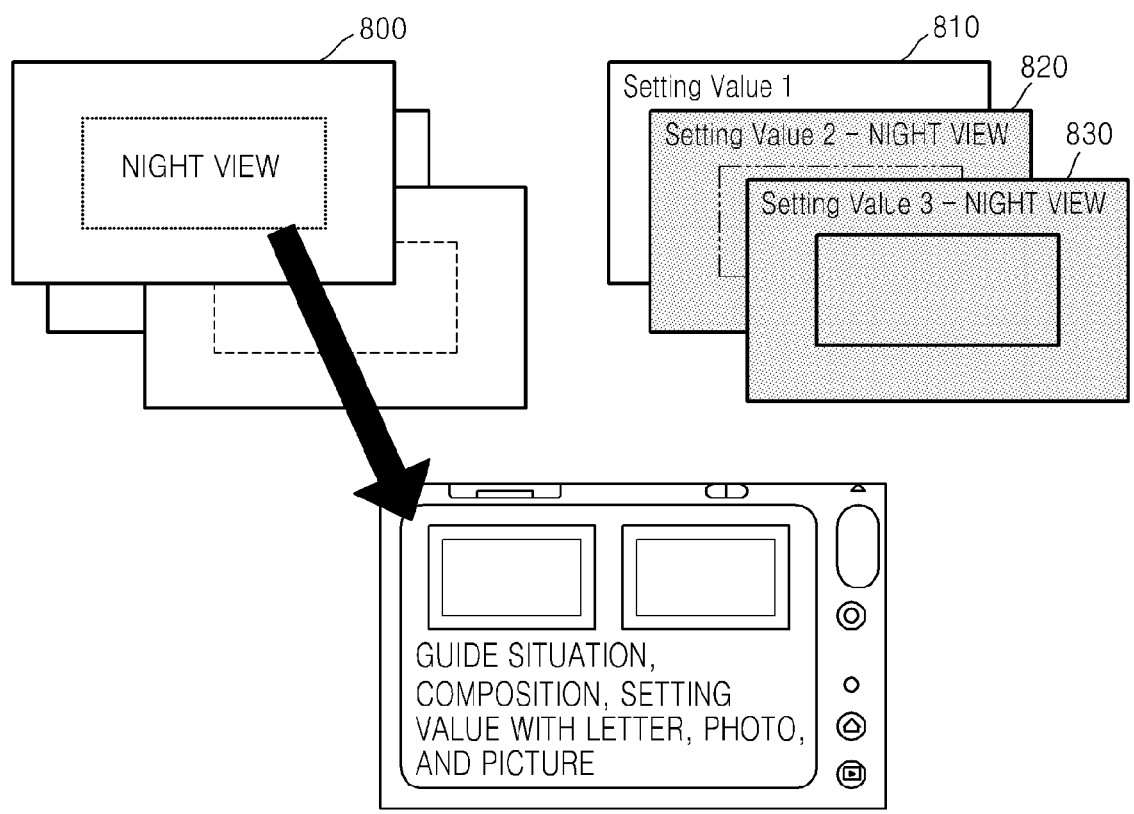
FIG. 8 illustrates a linkage photographing guide menu obtained by combining a qualitative description menu and a quantitative setting menu with each other, according to another embodiment.

FIG. 8 illustrates a linkage photographing guide menu obtained by combining a quantitative description menu and a qualitative menu with each other, according to another embodiment. Referring to FIG. 8, when a qualitative description menu 800 regarding a night view is selected from the qualitative description guide unit 172, the controller 171 may recommend quantitative setting menus 820 and 830 each including a photographing setting value, which match the night view, among a plurality of quantitative setting menus 810, 820, and 830 to the user. For example, when the qualitative description corresponds to the night view, quantitative setting menus that are most used in the night view are recommended during linkage. In contrast, when a quantitative setting menu is selected as a macro, a qualitative description that corresponds to the macro may be recommended.

Figure 9:
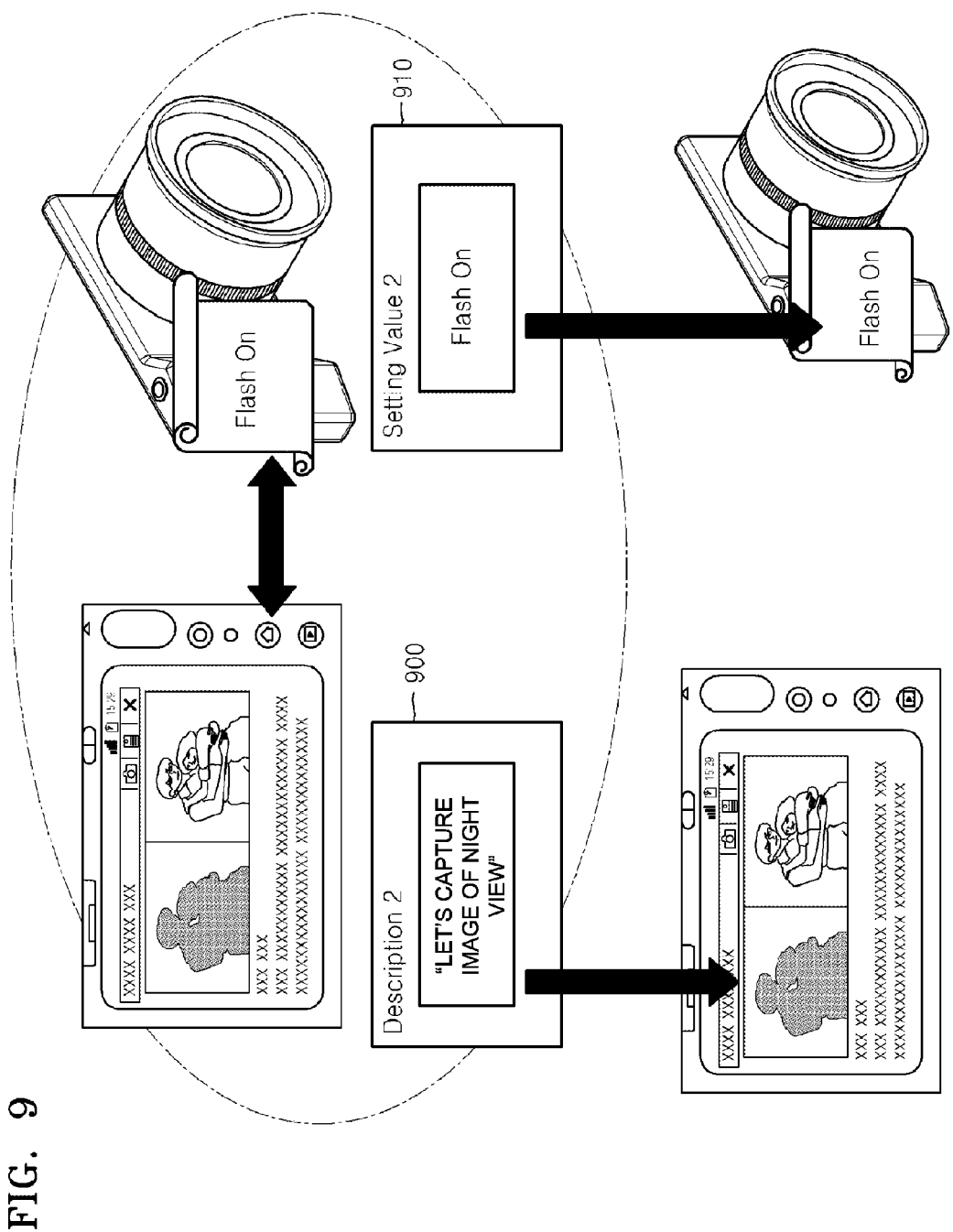
FIGS. 9, 10, and 11 are views illustrating various examples of other embodiments.
Figure 10:
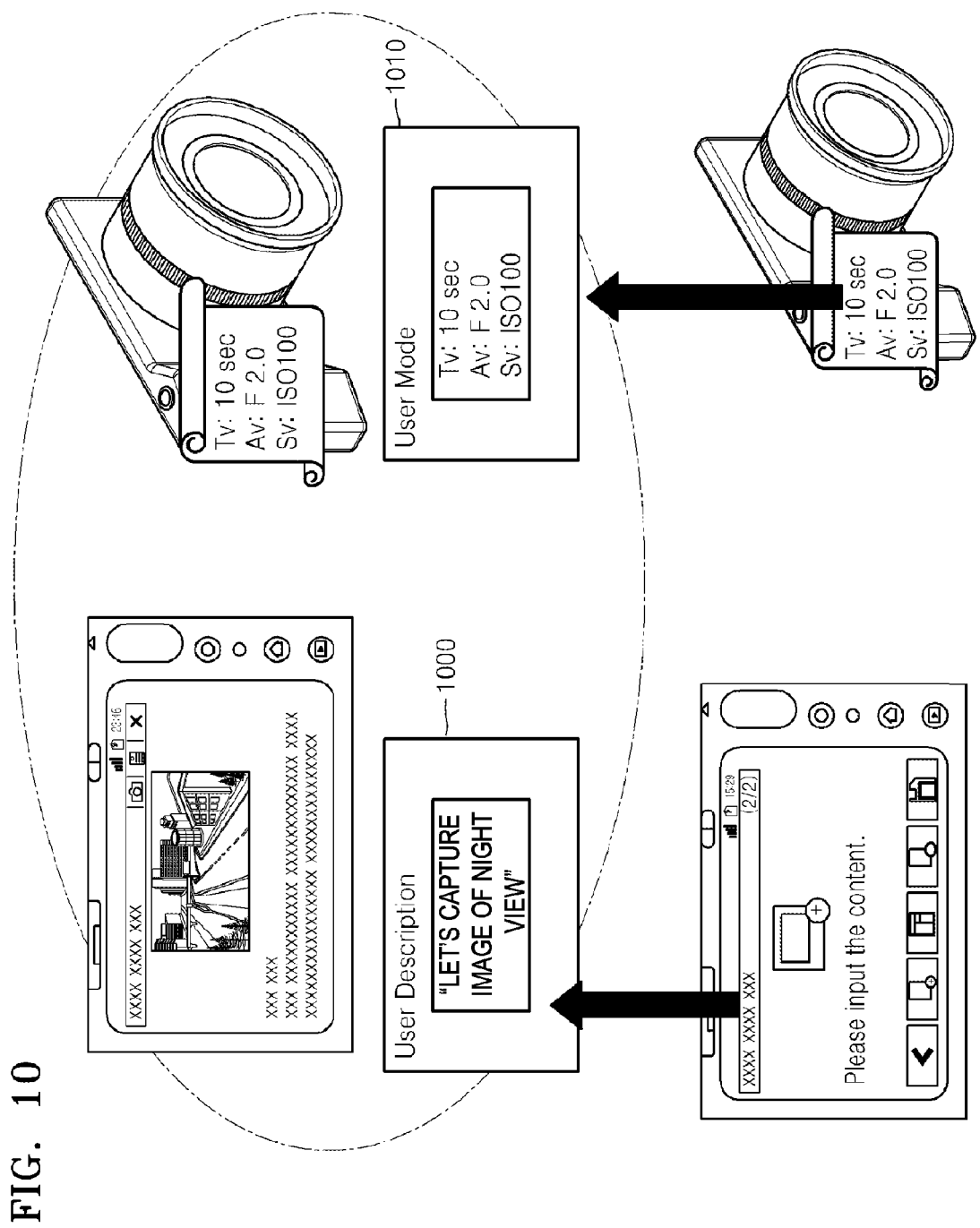
Figure 11:
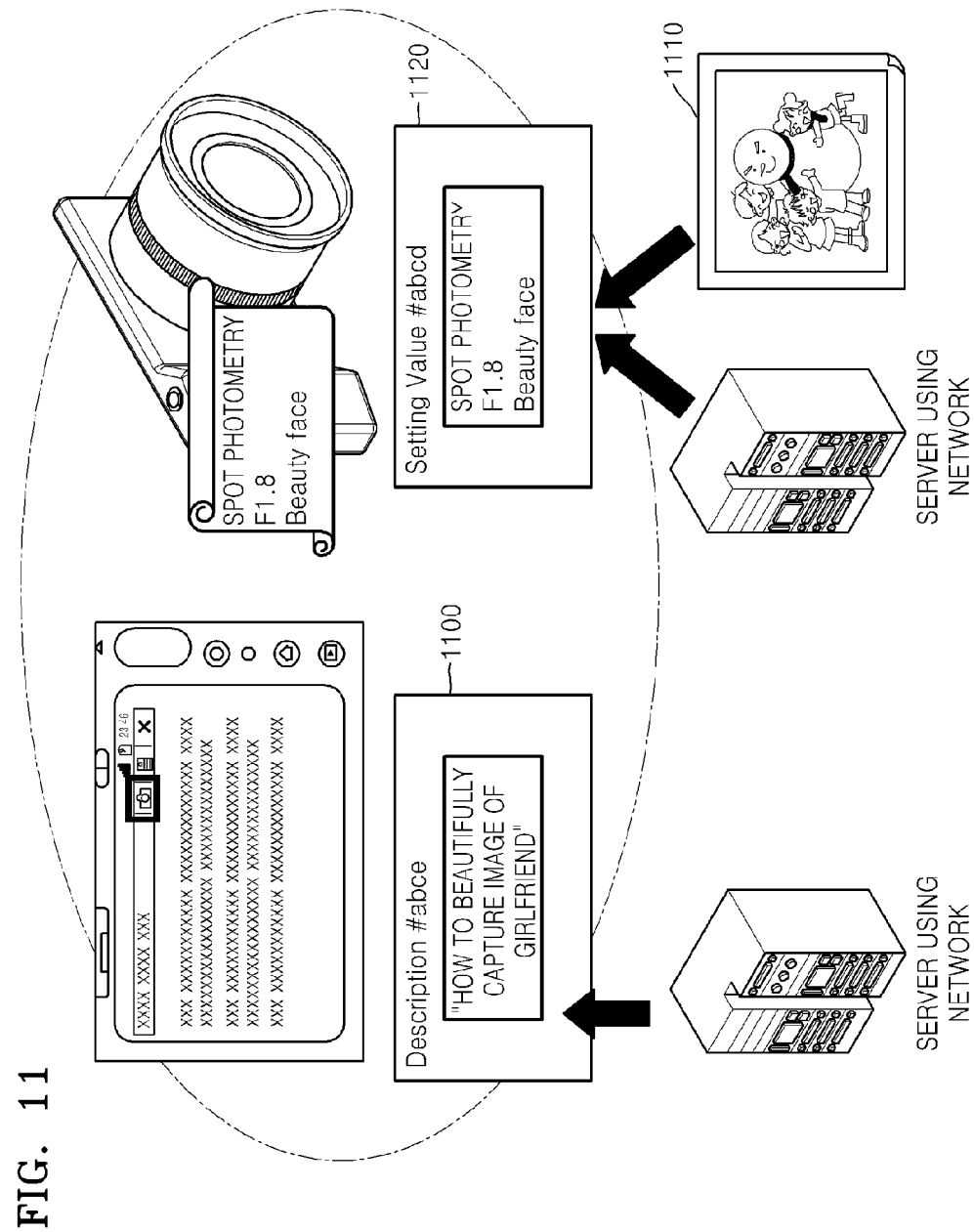

FIGS. 9, 10, and 11 are views illustrating various examples of other embodiments. Referring to FIG. 9, as an example of linkage for a professional night view photographing method, a qualitative description menu provided by the qualitative description guide unit 172 and a quantitative setting menu provided by the quantitative setting unit 173 are stored in the memory 130 of the electronic apparatus 1.

The user selects a qualitative guide menu 900 via which a good night view photo may be made, from among a plurality of qualitative guide menus including a manual for a night view photo. Also, the user selects a quantitative setting menu 910 including a setting value 'flash on' of several setting values from among a plurality of quantitative setting menus.

The mixed linkage unit 174 generates a linkage photographing guide menu obtained by combining a qualitative description menu and a quantitative setting menu. When the user selects the linkage photographing guide menu, it is described that, when backlight is severe, children's expressions may be delicately represented using a flash. In this case, when the user changes a current mode of the electronic apparatus 1 into a photographing mode immediately without the need of manipulating the electronic apparatus 1 according to the description, flash is set to be 'on' immediately using the controller 171 so that photographing may be performed as guided with writing. Thus, the electronic apparatus 1 according to the current embodiment allows the user to easily perform professional backlight photographing.

FIG. 10 is an example of linkage for a professional night view photographing method. Both the qualitative description guide unit 172 and the quantitative setting unit 173 may use a qualitative description menu and a quantitative setting menu that are created by the user using a function of the electronic apparatus 1.

The user creates a qualitative description menu 1000 including a user description in which photographing is recommended to be performed in fine weather, the usage of long exposure is recommended, an aperture is recommended to be tightened as much as possible and ISO is set to 100, using night view photographing knowhow. The user creates a quantitative setting menu 1010 as a user mode in which the aperture is tightened with a user' desired setting value, ISO is 100 and a shutter speed is 10 seconds. The mixed linkage unit 174 creates a linkage photographing guide menu obtained by the qualitative description menu 1000 created by the user and the quantitative setting menu 1010. When the user executes the linkage photographing guide menu, a photographing operation may be performed with a quantitative photographing settings of aperture of F 2.0, ISO of 100 and a shutter speed of 10 seconds, by pressing a shutter release without the need of manipulating the electronic apparatus 1 while watching the description. Thus, the user may create the linkage photographing guide menu including two night view photographing knowhow and may make a professional photo using the linkage photographing guide menu.

FIG. 11 is an example of linkage for professional photographing of a girlfriend. Both the qualitative description guide unit 172 and the quantitative setting unit 173 may use a qualitative description menu 1100 and a quantitative setting menu 1120 that are downloaded from the server 2 and that are created by another user.

The qualitative description menu 1100 that is uploaded by another user in which the usage of lighting is recommended, the usage of a bright lens is recommended and no background is recommended, using girlfriend photographing knowhow, is downloaded from the server 2. The user may select a quantitative setting menu including a photographing setting value that is uploaded by another user onto the server 2 or a quantitative setting menu including a photographing setting value obtained by parsing EXIF information from a previous image 1110 that has been previously captured by the user.

The mixed linkage unit 174 creates a linkage photographing guide menu by combining the qualitative description menu 1100 and the quantitative setting menu 1120. When the user executes the linkage photographing guide menu, the user may perform photographing with a photographing setting value by changing a current mode of the electronic apparatus 1 into a photographing mode using a switch button while watching the description or by immediately pressing the shutter release.

Figure 12:
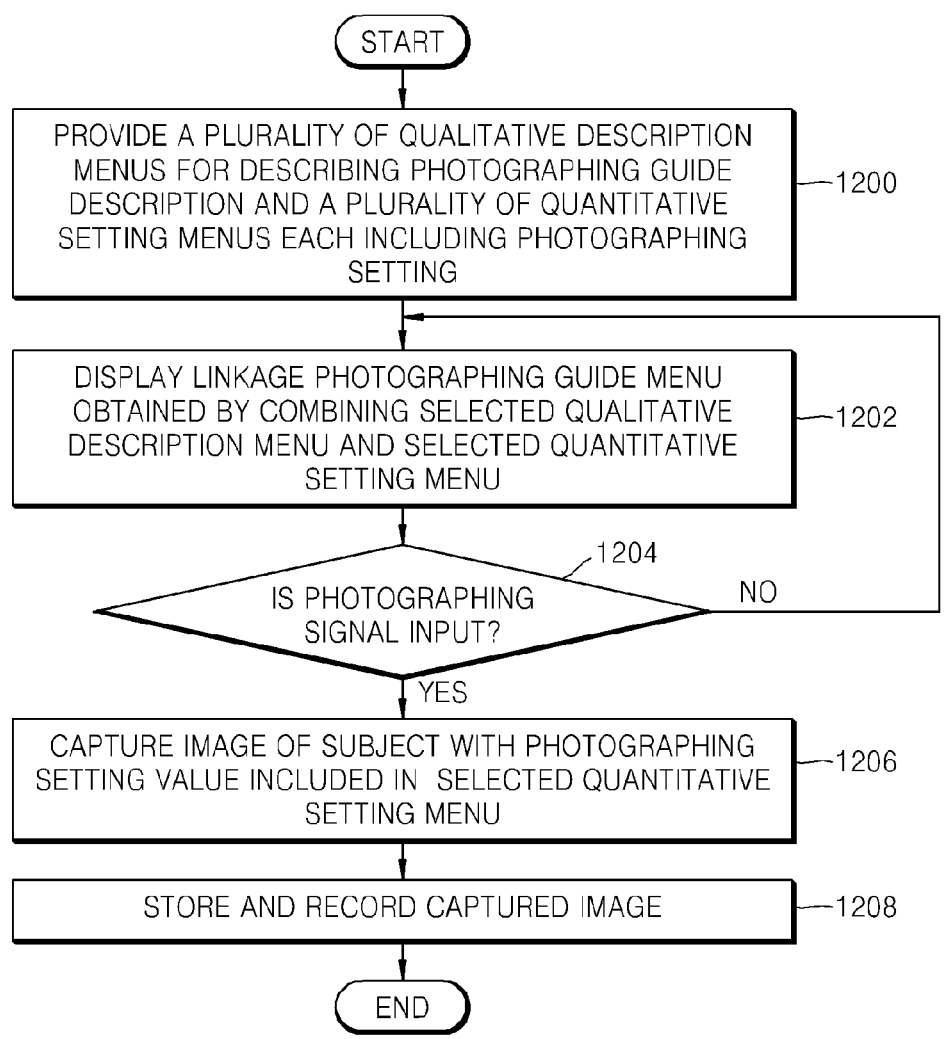
FIG. 12 is a flowchart illustrating a method of controlling an electronic apparatus having a photographing function, according to an embodiment.

FIG. 12 is a flowchart illustrating a method of controlling an electronic apparatus having a photographing function, according to an embodiment. Referring to FIG. 12, in Operation 1200, a plurality of qualitative description menus for describing a photographing guide description and a plurality of quantitative setting menus each including a photographing setting value are provided. Here, the plurality of qualitative description menus or the plurality of quantitative setting menus may be stored in the electronic apparatus 1 or an external device (for example, a server) connected to a network and may be created by the user himself/herself or a manufacturer, or by parsing EXIF information of a previous image that has been captured by another user.

In Operation 1202, a linkage photographing guide menu obtained by combining the selected qualitative description menu and the selected quantitative setting menu is displayed. In the linkage photographing guide menu, an electronic apparatus may be set with the photographing setting value included in the quantitative setting menu while displaying the qualitative description menu on a display unit of the electronic apparatus. Also, when a current mode of the electronic apparatus is changed into a photographing mode on a screen on which the linkage photographing guide menu is displayed, the photographing setting value may be set in the electronic apparatus, and a live view image may also be displayed.

In Operation 1204, if a photographing signal is input, an image of a subject is captured with the photographing setting value included in the selected quantitative setting menu in Operation 1206.

In Operation 1208, the captured image is stored and recorded.

As described above, according to the one or more embodiments, a mixed linkage guide is provided so that a qualitative description and a quantitative setting may be reused and the qualitative description and the quantitative setting to be added later can link with each other freely.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a computer-readable media such as non-transitory magnetic storage media (e.g., magnetic tapes, hard disks, floppy disks), non-transitory optical recording media (e.g., CD-ROMs, Digital Versatile Discs (DVDs), etc.), and non-transitory solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling an electronic apparatus having a photographing function, the method comprising:
   providing a plurality of qualitative description menus for describing a photographing guide function and a plurality of quantitative setting menus each including a photographing setting value;
   either: (i) selecting one of the qualitative description menus, displaying at least two matching quantitative description menus, and selecting one of the at least two displayed quantitative description menus; or (ii) selecting one of the quantitative description menus, displaying at least two matching qualitative description menus, and selecting one of the at least two displayed qualitative description menus;
   creating a linkage photographing guide menu by combining a selected qualitative description menu selected from among the plurality of qualitative description menus with a selected quantitative setting menu selected from among the plurality of quantitative setting menus;
   displaying the linkage photographing guide menu; and
   when a photographing signal for capturing an image of a subject is received, controlling a photographing operation based on the photographing setting value included in the selected quantitative setting menu.

2. The method of claim 1, further comprising downloading at least one of the plurality of qualitative description menus and the plurality of quantitative setting menus from an external device connected to a network.

3. The method of claim 1, further comprising storing at least one of the plurality of qualitative description menus and the plurality of quantitative setting menus in an internal memory of the electronic apparatus.

4. The method of claim 1, further comprising storing at least one of the plurality of qualitative description menus and the plurality of quantitative setting menus in an external memory that is attached to or detached from the electronic apparatus.

5. The method of claim 1, wherein the selected quantitative setting menu is selected from among the plurality of quantitative setting menus so as to match the selected qualitative description menu.

6. The method of claim 1, wherein the selected qualitative description menu is selected from among the plurality of qualitative description menus so as to match the selected quantitative setting menu.

7. The method of claim 1, further comprising creating the plurality of qualitative description menus and the plurality of quantitative setting menus by a manufacturer of the electronic apparatus, an expert, or a user.

8. The method of claim 1, further comprising creating at least one quantitative setting menu from among the plurality of quantitative setting menus based on the photographing setting value included in additional information of an image file.

9. The method of claim 1, further comprising:
   receiving a selection signal of a photographing mode disposed on a display screen on which the linkage photographing guide menu is displayed;
   converting a current mode of the electronic apparatus into a photographing mode for capturing an image of the subject according to the received selection signal; and
   displaying a live view image including the subject.

10. A non-transitory recording medium having a program for executing the method of claim 1 in a computer recorded thereon.

11. An electronic apparatus having a photographing function comprising:
    a qualitative description guide unit that provides a plurality of qualitative description menus for describing a photographing guide function;
    a quantitative setting unit that provides a plurality of quantitative setting menus each including a photographing setting value;
    a mixed linkage unit that creates a linkage photographing guide menu by combining a selected qualitative description menu selected from among the plurality of qualitative description menus with a selected quantitative setting menu selected from among the plurality of quantitative setting menus; and a controller that displays the linkage photographing guide menu and when a photographing signal for capturing an image of a subject is received, controls a photographing operation based on the photographing setting value included in the one selected quantitative setting menu, wherein the controller either: (i) selects one of the qualitative description menus, displays at least two matching quantitative description menus, and selects one of the at least two displayed quantitative description menus; or (ii) selects one of the quantitative description menus, displays at least two matching qualitative description menus, and selects one of the at least two displayed qualitative description menus.

12. The electronic apparatus of claim 11, wherein at least one of the plurality of qualitative description menus and the plurality of quantitative setting menus is downloaded from an external device connected to a network.

13. The electronic apparatus of claim 11, further comprising a storage unit that stores at least one of the plurality of qualitative description menus and the plurality of quantitative setting menus.

14. The electronic apparatus of claim 11, further comprising an external memory that stores at least one of the plurality of qualitative description menus and the plurality of quantitative setting menus.

15. The electronic apparatus of claim 11, wherein the mixed linkage unit selects the selected quantitative setting menu from among the plurality of quantitative setting menus so as to match the selected qualitative description menu or selects the selected qualitative description menu from among the plurality of qualitative description menus so as to match the selected quantitative setting menu.

16. The electronic apparatus of claim 11, wherein the plurality of qualitative description menus and the plurality of quantitative setting menus are created by a manufacturer of the electronic apparatus, an expert, or a user.

17. The electronic apparatus of claim 11, wherein at least one quantitative setting menu from among the plurality of quantitative setting menus is created based on the photographing setting value included in additional information of an image file.

* * * * *